Patented May 7, 1946

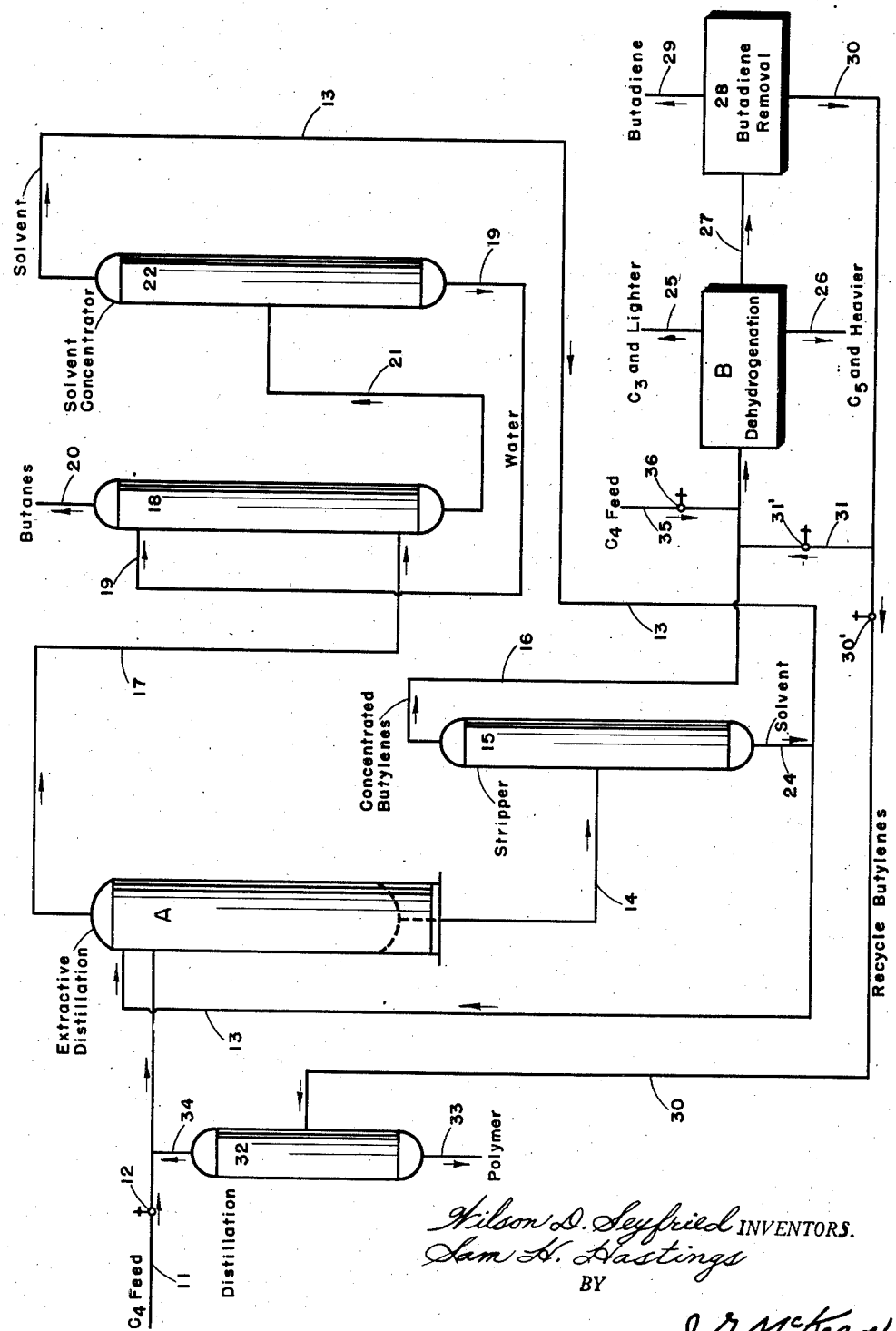

2,399,895

UNITED STATES PATENT OFFICE 2,399,895

DEHYDROGENATION AND ISOMERIZATION OF OLEFINS

Wilson D. Seyfried, Wooster, and Sam H. Hastings, Baytown, Tex., assignors to Standard Oil Development Company, a corporation of Delaware Application July 21, 1944, Serial No. 545,898

9 Claims. (Cl. 260—680)

The present invention is directed to the treatment of a hydrocarbon mixture including olefins and paraffins. In its more specific aspects, the present invention is directed to a process for treating hydrocarbons including the treatment of a mixture including olefins and paraffins in a thermal catalytic step and the subsequent treatment of at least a portion of the product from the thermal catalytic step by a solvent extraction step to obtain a fraction with a high olefin concentration.

It is conventional to the art to subject a hydrocarbon mixture having a high concentration of mono-olefins to a thermal catalytic step wherein the mixture is contacted with catalyst under conditions to cause a substantial portion of the mono-olefin to be converted to diolefin. The diolefin is removed from the product, leaving a residue including mono-olefins and paraffins. It is conventional to recycle a portion of the residue to the dehydrogenation step, but in order to prevent the building up of an undesirably high concentration of paraffins in the dehydrogenation zone it has heretofore been necessary to discard a portion of the residue, which contains valuable amounts of olefins as well as the undesired paraffins.

We have now discovered that by the use of a suitable catalytic mass with which the hydrocarbon mixture is brought in contact in the thermal treatment step, substantial isomerization of mono-olefins is obtained as well as conversion of mono-olefin to diolefin. The employment of this catalyst in the thermal catalytic step enables the production of a product from which the diolefin may be removed to produce a residue readily separable into mono-olefins and paraffins whereby the mono-olefins may be recycled to the thermal catalytic zone without the necessity of discarding any of these valuable materials from the system.

The invention has been found particularly desirable in the treatment of a mixture of $C_4$ hydrocarbons including paraffins and olefins. It is common in commercial operations to prepare a $C_4$ fraction by distillation, and such a fraction will contain a mixture of butylene-1, butylene-2, normal butane and isobutane. Such a mixture is not considered a desirable feed for a catalytic dehydrogenation step in the production of di-olefins because the constituents other than butylene-1 and butylene-2 serve principally as diluents when present in the reaction zone. If this mixture of mono-olefins and paraffins is subjected to extractive distillation, the butylene-2 may be readily separated from the paraffins to obtain a concentrated mono-olefin fraction; but the separation of paraffins, particularly normal butane, from the butylene-1 is somewhat more difficult, and in order to avoid discarding butylene-1 from the system a substantial portion of normal butane is retained in the feed supplied the dehydrogenation zone.

In accordance with the present invention a mixture of $C_4$ hydrocarbons including paraffins and mono-olefins is treated in a thermal catalytic zone with a catalyst capable of converting substantial amounts of $C_4$ mono-olefins to butadiene and capable as well of isomerizing substantial amounts of the $C_4$ mono-olefin. The product from this catalytic zone is treated to separate butadiene therefrom and the remainder is recycled. The isomerization of the mono-olefins insures a substantial portion of butylene-2 in this remaining portion and the butylene-2 may be readily separated from paraffins by an extractive distillation step to obtain a concentrated mono-olefin fraction. After the butadiene has been removed from the product of the thermal catalytic zone the remainder may be subjected to any one of several alternative treatments. If desired, a portion of the remainder may be returned directly to the dehydrogenation zone and the remaining portion subjected to an extractive distillation step for the removal of paraffins and the concentration of mono-olefins, and the concentrated mono-olefin fraction then returned to the dehydrogenation step. As another optional arrangement, the remainder may be mixed with the feed and the admixture sent to the extractive distillation step for removal of paraffinic hydrocarbons and then to the dehydrogenation zone. As an alternative, but usually less desirable, procedure, the remainder may be sent to the extractive distillation step for the removal of paraffins and then mixed with the feed and sent to the catalytic dehydrogenation step.

As has been stated heretofore, the composition of the catalyst mass employed in the thermal dehydrogenation step is of critical importance. It has been found desirable to employ for this catalytic mass a material having the following composition:

| | Per cent |
|---|---|
| MgO | 80 |
| $Fe_2O_3$ | 14 |
| $K_2O$ | 3 |
| CuO | 3 |

It will be noted that the catalyst composition is shown as a mixture of several metallic oxides expressed by the usual chemical formulae. It is to be understood, of course, by the skilled worker that the identification of the particular oxides does not preclude the possibility that the several compounds may exist in other forms than those shown for illustration. For example, the iron oxide shown as $Fe_2O_3$, may be $Fe_3O_4$, $FeO$, or mixtures thereof. This likewise holds true for the other oxides of the catalyst composition. When this catalytic mass is employed in a thermal zone at a temperature in the range of 1150° to 1300° F. it is capable of producing a product comprising diolefin and having the ratio of mono-olefins therein of 1.67 parts of butylene-2 to 1 part of butylene-1. It is desirable to employ from 5 to 10 volumes of steam per volume of hydrocarbon in the catalytic zone and a pressure ranging from atmospheric to 10 pounds per square inch above atmospheric, with space velocities ranging from 200 to 500 volumes of feed per volume of catalytic mass per hour.

A preferred embodiment of the present invention will now be described in conjunction with the drawing, in which the sole figure is in the form of a diagrammatic flow sheet.

In the drawing, A designates a vessel for carrying out an extractive distillation step, and B an apparatus for conducting a catalytic dehydrogenation step. An inlet line 11, controlled by valve 12, discharges into an upper portion of vessel A and serves to supply a mixture of $C_4$ hydrocarbons including mono-olefins and paraffins as feed to the extractive distillation step. Solvent is added to vessel A by means of line 13, discharging into the upper portion of vessel A at a point above the entrance of line 11 thereto. A number of organic solvents are available which are capable of separating paraffins from olefins in the extractive distillation step, and of these known solvents it is preferred to employ either acetone or furfural as the solvent. When employing acetone as the solvent, the solvent is discharged into tower A via line 13. A solution of solvent and mono-olefins with a minor portion of paraffin is removed from the lower portion of tower A through line 14 and discharged into stripping tower 15. In the stripping tower a hydrocarbon fraction comprising a major portion of mono-olefin and a minor portion of paraffin is discharged as overhead through line 16 and is sent as feed to the thermal catalytic dehydrogenation step B.

The overhead from tower A consists of solvent and paraffinic hydrocarbons. This overhead fraction is removed through line 17 to the lower portion of a tower 18, where the vapors are washed by being contacted with a stream of water discharged into the upper portion of tower 18 through line 19. The washed paraffinic vapors are removed as overhead through outlet 20. The washing water having solvent dissolved therein is removed from the bottom of tower 18 by line 21 and is sent to distillation tower 22 in order to separate the solvent from the water. Concentrated solvent is removed from tower 22 as overhead by line 13, and water is removed through line 19 and returned to tower 18.

Mono-olefins are removed as overhead from stripping vessel 15 and off through line 16, while solvent is recovered as bottoms and removed through line 24. The solvent in line 24 is admixed with that flowing in line 13, and this mixture is returned to the extractive distillation step conducted in vessel A.

In the dehydrogenation step conducted in unit B, the mixture of $C_4$ hydrocarbons comprising a major portion of butylenes but contaminated with a minor portion of paraffins is treated in a thermal catalytic zone which contains a dehydrogenation catalyst consisting approximately of 80% $MgO$, 14% $Fe_2O_3$, 3% $K_2O$ and 3% $CuO$ maintained at temperatures ranging from 1150° to 1300° F. This thermal catalytic zone causes the conversion of substantial portions of butylenes to butadiene and the isomerization of the remaining butylenes so that the butylenes in the product removed from this zone have a ratio of butylene-2 to butylene-1 of about 1.67 to 1. The product removed from the catalytic thermal zone is quenched rapidly, preferably by being contacted first with a water spray in the reactor, then by heat exchange, then with an oil quench step, then with additional heat exchange, and finally with a water quench step. These quenching steps are well known to the dehydrogenation art and accordingly are not shown in detail in the drawing. After the product has been quenched it may be treated by distillation to separate $C_3$ hydrocarbons therefrom and $C_5$ and heavier hydrocarbons therefrom. The removal of the $C_3$ and $C_5$ hydrocarbons is usually accomplished by distillation equipment operated in connection with the dehydrogenation unit and is indicated diagrammatically in the drawing by the outlet line 25 for the removal of $C_3$ hydrocarbons from zone B and outlet line 26 for the removal of $C_5$ and heavier hydrocarbons from this zone. The $C_4$ stream from unit B may then be sent through line 27 to a butadiene removal step in unit 28. It is usual to remove butadiene from a mixture of $C_4$ hydrocarbons by solvent extraction, and since this is conventional the several manipulative operations are not shown in detail in the drawing, but the butadiene is simply indicated as being removed from unit 28 by means of outlet line 29 and the residue hydrocarbons, comprising principally butylene, are removed through line 30.

The stream removed from vessel 28 by means of line 30 usually comprises butylene-1, butylene-1, butylene-2 and small amounts of isobutylene, isobutane and normal butane, which act as impurities in the stream. In the preferred operation the stream flowing in line 30 is split, with a portion being withdrawn through line 31 and admixed with the stream flowing in line 16 and returned to the catalytic dehydrogenation step conducted in vessel B, while the remainder is sent to the extractive distillation step. In the drawing line 30 is provided with valve 30′ and line 31 is provided with valve 31′ in order to allow an operator to control the amount of material sent from line 30 to the catalytic dehydrogenation step in unit B and the amount sent to the extractive distillation step in vessel A. The fraction flowing in line 30 will usually be contaminated by a small portion of high boiling point polymers, and accordingly it is desirable to pass the stream from line 30 into distillation tower 32, where the polymer is separated as bottoms and removed through outlet 33, while the $C_4$ hydrocarbons are removed as overhead through line 34 and are passed through inlet line 11 to extractive distillation tower A.

It will be understood that, if desired, valve 31′ may be closed in order to send all of the $C_4$ fraction removed from unit 28 to the extractive distillation step. It will also be evident that, if desired, the recycled fraction may be extracted either continuously or in a step-wise manner;

that is to say, all of the material in line 30 may be returned directly to vessel B until the impurities in the stream have built up to a predetermined value and then all of the stream containing these impurities may be sent to extractive distillation step A.

As an alternative operation in the practice of the present invention the hydrocarbon mixture fed to the system may be sent directly to the thermal dehydrogenation step, rather than to the extractive distillation step. When it is desired to follow this procedure, the $C_4$ hydrocarbon fraction employed as feed may be supplied to the system through inlet line 35, controlled by valve 36. When the hydrocarbon feed mixture is supplied directly to the catalytic dehydrogenation step in unit B, substantial portions of the butylenes in the feed are converted to butadiene and the butylenes are isomerized so that the product removed from vessel B has a ratio of butylene-2 to butylene-1 of 1.67 to 1, and after the removal of butadiene from the product in unit 28 the remainder may be readily separated into a paraffin fraction and an olefin fraction in the extractive distillation step in vessel A. This alternative procedure will usually not be desirable because the hydrocarbon feed will usually contain substantial amounts of paraffin which will be thermally treated with the olefins in the catalytic dehydrogenation zone B, and which, for the most part, will pass through the zone without change, but will serve as a diluent in the zone. In order to use the several portions of the apparatus in an optimum manner, it is usually desirable to send a stream having olefins concentrated therein to the dehydrogenation zone, and to obtain such a stream it is desirable to subject the feed stream to a preliminary extractive distillation step to remove at least a portion of the paraffins therefrom.

It will be seen that we have disclosed a method for treating a $C_4$ hydrocarbon stream comprising paraffins and mono-olefins to isomerize butylenes therein, with the subsequent separation of paraffinic materials from the butylenes by extraction. It will also be seen that in addition to the treatment of a mixture comprising paraffins and butylenes in order to separate paraffins from the stream without discarding valuable butylenes therefrom, we also convert appreciable portions of mono-olefins to diolefins.

While the present invention has been described and illustrated with respect to the isomerization of butylene-1 to butylene-2, it is also possible in the present invention to isomerize butylene-2 to butylene-1. In an operation where 100 parts of butylene-2 were charged to the dehydrogenation step B at the conditions encompassed in the present invention, there were produced 30 parts of butylene-1, 17.5 parts of butadiene, 2.5 parts of other hydrocarbons, with 50 parts of the butylene-2 passing unchanged through the vessel B.

Having fully described and illustrated the practice of the present invention, what we desire to claim is:

1. A method for treating a hydrocarbon fraction including a $C_4$ paraffin and a $C_4$ mono-olefin comprising the steps of bringing the fraction into contact with a catalyst which comprises approximately 80% MgO, 14% $Fe_2O_3$, 3% $K_2O$ and 3% CuO and is maintained at a temperature in the range of 1150° to 1300° F. to cause the isomerization of substantial amounts of $C_4$ mono-olefin and the formation of substantial amounts of $C_4$ diolefin in the product, removing product from the catalyst and separating diolefin therefrom.

2. A method in accordance with claim 1 in which the product removed from the catalyst has diolefin and paraffin removed therefrom and in which the remaining unsaturated constituents are again brought into contact with the catalyst.

3. A method in accordance with claim 1 in which the major portion of the $C_4$ mono-olefin in the feed is butylene-1.

4. A method in accordance with claim 1 in which at least a major portion of the $C_4$ mono-olefin is butylene-2.

5. A method for treating hydrocarbons comprising the steps of subjecting a feed including $C_4$ paraffin and $C_4$ mono-olefin to an extraction step to remove paraffin from the feed, removing product from the extraction step and bringing it into contact with a catalyst which comprises approximately 80% $MgO_2$, 14% $Fe_2O_3$, 3% $K_2O$ and 3% CuO and is maintained at a temperature in the range of 1150° to 1300° F., maintaining the hydrocarbons in contact with the catalyst for a sufficient interval of time to allow the formation of substantial amounts of $C_4$ diolefin and the isomerization of substantial amounts of $C_4$ mono-olefin, removing the resulting hydrocarbons from contact with the catalyst, separating diolefin therefrom and employing at least a portion of the remainder as feed for the extraction step.

6. A method in accordance with claim 5 in which at least a major portion of the $C_4$ mono-olefin in the feed is butylene-1.

7. A method in accordance with claim 5 in which at least a major portion of the $C_4$ mono-olefin in the feed is butylene-2.

8. A method for treating hydrocarbons comprising the steps of passing a feed stock including isobutane, normal butane, butylene-1 and butylene-2 to an extraction step, in which the feed is contacted with a solvent under conditions as to remove a portion of butane and isobutane from the feed, removing the remainder of the feed stock from the extraction step, separating solvent therefrom and subsequently contacting it with a catalyst which comprises approximately 80% MgO, 14% $Fe_2O_3$, 3% $K_2O$ and 3% CuO in a catalytic reactor zone maintained at a temperature in the range of 1150° to 1300° F., maintaining the hydrocarbon mixture in the catalytic zone for a sufficient interval of time to cause the formation of substantial amounts of butadiene and butylene-2, removing product from the catalytic zone, separating butadiene from the product, separating the remainder of the product into a first portion and a second portion, returning the first portion to the catalytic zone and returning the second portion to the extraction step.

9. A method in accordance with claim 8 in which the hydrocarbon sent to the catalytic zone is diluted with steam in a ratio of 7 parts of steam to 1 part of hydrocarbon, in which the catalytic zone is maintained at a pressure in the range of atmospheric to 10 pounds per square inch above atmospheric.

WILSON D. SEYFRIED.
SAM H. HASTINGS.